US008815982B2

(12) United States Patent
Xu et al.

(10) Patent No.: US 8,815,982 B2
(45) Date of Patent: Aug. 26, 2014

(54) COLORED SYSTEM

(75) Inventors: Chang Xu, Macungie, PA (US); Craig Keemer, Reading, PA (US); Hai Hui Lin, Naperville, IL (US); Parfait Jean Marie Likibi, Mount Pleasant, SC (US)

(73) Assignee: Silberline Manufacturing Company, Inc., Tamaqua, PA (US)

( * ) Notice: Subject to any disclaimer, the term of this patent is extended or adjusted under 35 U.S.C. 154(b) by 0 days.

(21) Appl. No.: 12/839,982

(22) Filed: Jul. 20, 2010

(65) Prior Publication Data

US 2012/0022198 A1    Jan. 26, 2012

(51) Int. Cl.
*C08K 9/00*    (2006.01)

(52) U.S. Cl.
USPC ........... 523/205; 523/204; 428/403; 106/403; 106/404

(58) Field of Classification Search
USPC ............ 523/205, 204; 428/403; 106/403, 404
See application file for complete search history.

(56) References Cited

U.S. PATENT DOCUMENTS

| | | | |
|---|---|---|---|
| 4,359,504 A | 11/1982 | Troy | |
| 4,753,829 A | 6/1988 | Panush | |
| 5,037,475 A * | 8/1991 | Chida et al. .................. | 106/403 |
| 5,431,956 A | 7/1995 | Robb et al. | |
| 5,558,705 A | 9/1996 | Keemer et al. | |
| 5,763,548 A | 6/1998 | Matyjaszewski et al. | |
| 5,814,686 A | 9/1998 | Micale et al. | |
| 5,912,283 A * | 6/1999 | Hashizume et al. .......... | 523/213 |
| 6,022,911 A | 2/2000 | Hashizume et al. | |
| 6,057,384 A | 5/2000 | Nguyen et al. | |
| 6,113,683 A * | 9/2000 | Herren et al. ................. | 106/494 |
| 6,353,107 B1 | 3/2002 | Kramer et al. | |
| 6,538,047 B1 | 3/2003 | Miyabayashi | |
| 7,205,362 B2 | 4/2007 | Favier et al. | |
| 2002/0185378 A1 | 12/2002 | Honeyman et al. | |
| 2003/0137717 A1 | 7/2003 | Albert et al. | |
| 2003/0194415 A1* | 10/2003 | Wang et al. ................... | 424/400 |
| 2004/0024090 A1* | 2/2004 | Suda et al. .................... | 523/160 |
| 2006/0046194 A1* | 3/2006 | Hoshi et al. ................. | 430/270.1 |
| 2006/0156956 A1* | 7/2006 | Gane et al. ............... | 106/287.35 |
| 2007/0298259 A1 | 12/2007 | Matsumoto | |
| 2008/0022899 A1 | 1/2008 | Tsuji et al. | |
| 2008/0249209 A1 | 10/2008 | Trummer et al. | |
| 2008/0257212 A1 | 10/2008 | Ganapathiappan | |
| 2009/0117281 A1 | 5/2009 | Sato et al. | |
| 2009/0264575 A1* | 10/2009 | Henglein et al. .............. | 524/441 |
| 2011/0130510 A1 | 6/2011 | Xu et al. | |
| 2012/0022181 A1 | 1/2012 | Xu et al. | |

FOREIGN PATENT DOCUMENTS

| | | |
|---|---|---|
| DE | 10 2008 060 228 | 6/2010 |
| JP | 49-3735 B | 1/1974 |
| JP | 51-33134 | 3/1976 |
| JP | 52-60829 | 5/1977 |
| JP | 53-39328 | 4/1978 |
| JP | 56-501238 | 9/1981 |
| JP | 1-315470 | 12/1989 |
| JP | 05-508430 | 11/1993 |
| JP | 06-49109 | 2/1994 |
| JP | 2000-044835 | 2/2000 |
| JP | 2001-098206 | 4/2001 |
| JP | 2008-31349 | 2/2008 |
| JP | 2010-043224 | 2/2010 |
| JP | 2010-254934 | 11/2010 |
| RU | 2134705 | 8/1999 |
| RU | 2261260 | 9/2005 |
| RU | 2008126947 | 1/2010 |
| WO | WO 81/00826 | 4/1981 |
| WO | 91/04293 | 4/1991 |
| WO | WO 91/18951 | 12/1991 |
| WO | 01/92359 | 12/2001 |
| WO | 2010/032654 | 3/2010 |
| WO | 2010/066785 | 6/2010 |

OTHER PUBLICATIONS

Organic Coatings: Science and Technology, $3^{rd}$ Edition, (New York: John Wiley & Sons), pp. 440-446, 2007.
Printout from Thomas World Patents Index, Database WPI, Week 201023, Thomson Scientific, London, GB; AN2010-D43671, XP002660080 (4 pages).

* cited by examiner

*Primary Examiner* — Hannah Pak (74) *Attorney, Agent, or Firm* — Hamre, Schumann, Mueller & Larson, P.C.

(57) ABSTRACT

A colored system including a coated substrate and a color pigment that adheres to the coated substrate, and a method for producing the colored system are described. The disclosed method adheres effectively the color pigments to the coated substrates. The resulting colored system avoids their separation during coating applications. The colored metallic paints/inks can be prepared by mixing a color pigment solution with a coated substrate solution. The resulting colored system displays vivid color and strong metallic luster.

12 Claims, 3 Drawing Sheets

(2 of 3 Drawing Sheet(s) Filed in Color)

COLORED SYSTEM

FIELD

This disclosure relates generally to coated substrates and systems including the coated substrates, and particularly to the design of colored systems including the coated substrates.

BACKGROUND

Aluminum pigments are widely used in coatings, inks, plastics, and cosmetics to bring metallic effects. In order to achieve colored metallic effects, generally, aluminum pigments are used in conjunction with color pigments.

Colored metallic effects in coating applications can be achieved via a multilayer approach. In this approach, a layer of paint/ink containing metallic pigment is applied onto a substrate first, followed by a coating(s) of color pigments. While vivid colored metallic effects can be achieved, multilayer approaches are often coupled with high manufacturing costs, as supplemental equipment is necessary to accommodate the additional manufacturing steps. Further, the extra application procedures limit the product turn-over time. Moreover, considerations have to be given to address the interlayer interactions, such as wetting and adhesion during and after manufacturing.

To overcome such manufacturing complexities and high costs associated with the multilayer approach, extensive efforts have been made to achieve colored metallic effects with a one layer system. In this approach, colored pigments are mixed with metallic pigments in a one resin solution system before being applied. However, there are various challenges with the one layer approach and the desired effects using this approach are very difficult to achieve. For example, aluminum pigments have excellent hiding power, and therefore, a high concentration of color pigments has to be used with the aluminum pigments to achieve reasonable color strength. Since the density of the aluminum pigments is much higher than that of typical color pigments, resins, and solvents, the aluminum pigments tend to separate quickly from the rest of the components within the paints/inks. Moreover, while color pigments adopt various shapes and sizes ranging from a few nanometer to hundreds of nanometers, aluminum pigments mostly are platelet like and have sizes ranging from a few micrometers to hundreds of micrometers. These differences in physical parameters make colorant and aluminum pigment behave quite differently in a paint/ink system, thereby preventing uniform coating formation during the application processes.

Efforts have been made to develop aluminum pigments that have color pigments attached to them so as to alleviate the separation of color pigment from the aluminum substrates in the one layer system. For example, U.S. Pat. No. 5,037,475 utilizes thermally polymerizable carboxylic acid molecules containing at least two carboxylic acid groups to promote the absorption of organic pigments onto aluminum substrates. Polymer coatings are formed on the colored aluminum pigments upon the polymerization of the unsaturated carboxylic acid and a crosslinker. In U.S. Pat. No. 5,558,705, color pigments are first physically absorbed onto the surface of aluminum substrates. A coupling reagent is then used to modify the surface of the aluminum substrates and provides binding sites for subsequent polymer networks formed via solution polymerization. U.S. Pat. No. 5,912,283 uses a specific surface-treatment agent to coat color pigments and promote the adhesion between color pigments and the aluminum substrates. Polymer encapsulation is then applied to stabilize the attachment of color pigments on aluminum substrates. In these cases, polymerization is initiated in solution with the presence of crosslinkers to form a polymer network to stabilize the color pigments onto their surfaces. However, colored aluminum pigments manufactured using these approaches suffer from either heavy aggregation or heavy separation of color pigments from the aluminum substrates. As a result, despite tremendous market interests, commercial colored aluminum pigments, such as Silberline's Silbertone® and Showa's Friend Color™, have achieved little market significance.

SUMMARY

A colored system including a solvent, a coated substrate and a color pigment that adheres to the coated substrate, and a method for producing the colored system are described. The disclosed method attaches effectively the color pigments to the coated substrates. The resulting colored system exhibits minimal separation of color pigments and coated substrates during mixing, storage, solvent exchange and applications. The colored metallic paints/inks can be prepared by mixing a color pigment dispersion with a coated substrate dispersion. The resulting colored coated substrates display vivid color and strong metallic luster, an effect that has been very difficult to achieve employing methods that have been previously disclosed.

In one embodiment, the disclosed colored system includes a plurality of coated substrates and a plurality of color pigments. The coated substrates can be made of materials such as alumina, mica and glass. In one example, each of the coated substrates used includes a metallic substrate that is coated with polymers or polymer networks, where the polymers or polymer networks contain a functional group to adhere strongly to the color pigment, and the color pigment used is organic or inorganic. In this example, the color pigments adhere to the coated substrates as determined by a bleeding test. The bleeding test involves dispersing the colored system in one or more solvents and allowing the substrates to settle by sedimentation. In this case, the color pigments adhering to the coated substrates means that there is little, if any, coloration in the supernatant liquid and the sedimented substrates have a deep, even coloration. In the case where the degree of color pigment bleeding is quantified, the optical absorbance of the supernatant liquid is analyzed at a wavelength where the color pigments give maximum absorbance. The concentration of the color pigments in the solvent can be calculated using a linear regression equation obtained from a calibration curve of absorbance versus concentration for the specific colored pigment being utilized. If the weight of pigment and the solvent are held constant, the concentration of the color pigments in the solvent gives a relative measure of the amount of the pigment bleed.

In one instance, the functionality of the polymer coating involves providing an ionic charge that strongly bonds color pigments with an opposite ionic charge. In one implementation, the coating of the coated substrate is positively charged and the color pigments are negatively charged. In one instance, the positive charge of the coating arises from quaternary amines that enhance charge-to-charge interaction between the coated substrates and the color pigments.

In one embodiment of the disclosed method, substrates are first encapsulated within polymers. In one example, the polymers are synthesized via polymerization from initiators that are strongly attached to the surfaces of the substrates so that the resulting polymer chains have one chain end that is strongly attached to the surfaces of substrates. In this example, the resulting polymer chains/networks are strongly attached to the surfaces of substrates and the polymer coating retain structure integrity under typical reaction and process conditions.

In one instance, the composition of polymer coating can be readily adjusted during or after polymerization, allowing optimal interaction between polymer surfaces and color pigments. The polymer coating also has flexibility and allows the coating surface to be rearranged to maximize its interaction with color pigments. Unlike small molecules that are immobilized on the surfaces, the polymers can rearrange themselves. If the polymer chain is flexible enough, it will be able to follow the surface of the color pigments and increase the contact areas between the coating surfaces and color pigment. Using polymerization from surfaces, a thick stable polymer coating can be formed on the surface of the substrate without the addition of a crosslinker. As a result, the long polymer chains have the flexibility to maximize their contact with color pigments and greatly enhance the adhesion between the color pigments and the surfaces of the coated substrates.

In another embodiment, the disclosed colored system can be used directly as paints or inks. Traditional paint and inks are composed of multiple components and extensive efforts have to be diverted to paint/ink formulation and to achieve acceptable properties. In one example, the substrate used is an aluminum platelet or flake, and the coated aluminum platelets with the color pigments adhered thereto can be dispersed in a solvent and applied directly onto substrates. In this example, due to the improved orientation of coated platelets, the final coating displays enhanced metallic luster.

In yet another embodiment, the disclosed colored system can be added to other systems of paints, inks or plastics. In this embodiment, the resulting system may have characteristics similar to or better than those of conventional systems.

The disclosed method overcomes the separation of color pigments and coated substrates during the application processes of the colored system. In the disclosed systems, robust polymer encapsulation on the metallic substrates is designed to promote strong absorption of color pigments onto the metallic substrates and prevent the separation of color pigments from the metallic substrates under harsh processing conditions and in the presence of aggressive solvents. The disclosed systems are stable and allow great formulation flexibilities. They can be concentrated or solvent exchanged to reduce storage/shipping spaces, hazards, and costs. Additional solvents or other ingredients can be added on the consumer end immediately prior to application. In this approach, the disclosed systems can extend the shelf-life as side reactions between pigments, including both color pigments and metallic substrates, and other paint/ink components can be eliminated.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

A colored system including a coated substrate and a color pigment that adheres to the coated substrate, and a method for producing the colored system are described. The term "substrate" herein means transparent, metallic, white or colored, mineral or organic particles of any form, which are insoluble in a physiological medium and are suitable for use in ink, paint and plastic compositions. The term "color pigment" means an inorganic or organic particle that imparts color. The disclosed method adheres effectively the color pigments with the coated substrates. The resulting colored system avoids their separation during coating applications.

In one embodiment, the disclosed colored system includes color pigments, polymer coated substrates. In another embodiment, the disclosed colored system further includes a solvent.

The color pigment particles utilized in the colored system can be inorganic or organic (Pigment Handbook, Wiley-Interscience; 2 edition January 1988). In some examples, the color pigments can be, but is not limited to, phthalocyanine Pigment Green 7, phthalocyanine Pigment Blue 15:4, quinacridone Pigment Red 122, perylene Pigment Red 179, isoindolinone Pigment Yellow 110, isoindolinone Pigment Yellow 139, quinacridone Pigment Violet 19, quinacridone Pigment Red 122, etc.

The size of the color pigment can be from 1 nm to 200 nm. In one example, the size of color pigments range from 1 nm to 100 nm.

The polymer coated substrate used in the disclosed system can be an inorganic substrate. The inorganic substrate can be, but is not limited to, aluminum, mica and glass. The shape of the substrate can be, but is not limited to, a sphere or disk-shaped. In one embodiment, the size of the substrate is in a range from 100 nm to 1000 µm. In another example, the size of the substrate is in a range from 500 nm to 100 µm. In yet another example, the size of the substrate is in a range from 1 µm to 50 µm.

In one example, the substrate is encapsulated with an inorganic layer. The inorganic layer can include, but is not limited to, silica, glass, and metal oxide such as aluminum oxide, titanium oxide, and iron oxide.

In one example of the disclosed colored system, the coated substrates have enhanced affinity to the color pigments. In one instance, the surfaces of the coated substrates are positively charged and the color pigments are negatively charged. In one implementation, the surfaces of the coated substrates include quaternary amines that enhance charge-to-charge interaction between the coated substrates and the color pigments. In this instance, the coated substrates include polymers or polymer networks in which the tertiary amine groups of the polymers or polymer networks are quaternized with a reactive quaternizing agent. Examples of suitable polymers or polymer networks that include tertiary amine groups can be, but are not limited to, homopolymers or copolymers of 2-vinylpyridine, 3-vinylpyridine, 4-vinylpyridine, N,N-dimethylaminoethyl methacrylate, N,N-diethylaminoethyl methacrylate, N,N-dimethylaminoethyl acrylate, N,N-diethylaminoethyl acrylate, 3-(dimethylamino)propyl acrylate, 2-(diethylamino)ethylstyrene, N,N-dimethylaminopropyl acrylamide, N,N-dimethylaminopropyl methacrylamide, 3-dimethylaminoneopentyl acrylate, 3-dimethylaminoneopentyl methacrylate, 2-diisopropylaminoethyl methacrylate. The term "quaternized" herein means that a quaternizing agent of a small molecular reactant is chemically bound to a tertiary amine group to produce a quaternary amine. The term "quaternary amine" herein means a cationic amine salt in which the nitrogen atom has four groups bonded to it thusly carrying a positive charge. The quaternizing agent can be, but is not limited to, alkyl halides and aryl alkyl halides.

In another example, the polymer coating has flexibility and allows the coating surface to be rearranged to maximize its interaction with color pigments. The term "flexibility" herein means that the polymer chains of the polymer coating can readily rearrange their configuration such that the polymer chains can follow the surfaces of the color pigments and thereby increase the contact areas between the coating surfaces and the color pigments. In one instance, the polymer coatings have a dry coating thickness that is greater than 5 nm when measured using standard non-destructive procedures to measure the thickness of the coating surface. In another instance, the polymer chains are strongly attached to the surface of the substrates so as to provide robustness and stability of the coating. The term "robustness and stability" herein means the survivability of the coated substrates under circulation test, repeated solvent wash and typical reaction conditions. In yet another instance, the polymer chains are covalently bonded to the surface of the substrates. In these instances, the polymer chains have the flexibility to maximize their contact with color pigments and greatly enhance the adhesion between the color pigments and the surfaces of the coated substrates.

The solvents utilized in the disclosed colored system can be any materials or mixtures that are suitable for dispersing the coated substrates or the color pigments. In some examples, the solvents or solvent mixtures can be, but are not limited to, water, alcohols, hydrocarbons, ethers, esters, ketones, glycol ethers, pyrrolidones, and sulfoxides.

The amount of the coated substrates in the final product can be from 10% to 70%. The amount of the color pigments in the final product can range from 2% to 25%, and the amount of the solvent in the final product can range from 25% to 85%.

In one embodiment of the disclosed method, substrates are first coated with a polymer layer. In one example, the substrates utilized are aluminum flakes and polymerization from initiator moieties that are immobilized on surfaces of the aluminum flakes lead to the polymer coating on the aluminum flakes. Although in this example, the material utilized is aluminum, it is to be realized that in appropriate circumstances, the concepts described herein can be applied to other materials, so long as there is an existence of a method to immobilize initiator moieties onto the surface of the other materials.

In one implementation, the surface of the aluminum flake is modified with a coupling reagent, which contains at least one surface active group and at least one initiating moiety. In one instance, the initiator has a chemical structure X-R-Y, where X denotes a surface active group, Y denotes an initiator moiety, and R denotes a spacer. The initiator moieties are anchored to the substrate upon the reaction between surface active groups and functional groups that are present on surfaces of the flakes.

Alternatively, an initiator can be immobilized onto the surface of the aluminum flake through a multiple step process. In one example, the multiple step process is a two-step process. In this instance, a surface active molecule, X-R-A, is first applied to the surface of a flake. While functional group X immobilizes the molecules to the surfaces, functional group A allows further chemical reactions on flake surfaces and leads to the initiator moiety, Y, to be on the surfaces of the flake.

In one implementation, the substrates utilized are aluminum flakes. The aluminum flakes used can be, but are not limited to, conventional ball milled flakes, vacuum metallized flakes (VMF), silica encapsulated flakes, and metal oxide encapsulated flakes. Once exposed in air, the surface of aluminum reacts with oxygen forming aluminum oxide and aluminum hydroxide, and provides the surface hydroxyl groups necessary for the coupling reaction.

The surface active group X can be, but is not limited to, mono-, di-, and tri-alkoxylsilanes, mono-, di- and tri-chlorosilanes, carboxylic acid, organophosphorous compounds, and other chemical groups that have strong affinity to metal, metal oxide or silica surfaces. In case of trialkoxysilane and trichlorosilane, the intermolecular condensation among organosilane molecules leads to the formation of high density robust coating of such molecules.

The density of the initiators on the surface of the substrate can be adjusted by diluting the initiator bearing molecules with other surface active molecules. The diluting molecules may also bring additional functional groups to the surfaces.

By applying the same principle, glass flakes, which are mainly composed of silicon dioxide and some silanol groups on the surface, can be readily functionalized with similar coupling reagents. The disclosed method may be further applied to substrates other than aluminum and silica, so long as there is an existence of a functional group that has strong affinity to the substrate surfaces and immobilized initiator moieties to the substrate.

Other substrates also may be functionalized with initiators via silica or metal oxide encapsulation. For example, Iriodin 100, which is titanium oxide encapsulated mica, can be coated with polymers with the approach discussed above.

The initiator moiety Y can be any functional group that initiates free radical polymerization, controlled radical polymerization, and/or other chain polymerization. The initiator moiety Y can be, but is not limited to, an activated halogen atom, alkoxyamine, dithioester, dithiocarbamates, trithiocarbonates, xanthates organic peroxides, and azo compounds.

In one example, after the initiator is immobilized on the surface of the substrate, the substrate is purified via filtration to remove any unbounded coupling reagents before proceeding to the polymerization reaction. In another example where the existence of free coupling reagent in solution does not significantly increase the solution viscosity or adversely alter other process conditions in the following polymerization, the reaction solution is used directly without further purification.

The initiator-immobilized substrates then are dispersed in a monomer solution. The monomer solution can include one type of monomer or mixtures of different types of monomers. Examples of monomers that can be used include, but is not limited to, styrenes, (meth)acrylates, (meth)acrylamides, (meth)acrylic acids, acrylonitrile, vinylpyridines, maleimides, vinyl acetate, vinyl chloride, vinylidene chloride and isoprene. Following dispersion of the initiator immobilized substrates into the monomer solution, polymerization from surfaces lead to the formation of polymer chains that are attached to the substrate. Because of its small size, initiator molecules can be immobilized on the surface of the substrate with high area density. Therefore, this approach allows the synthesis of polymer coatings with high grafting density.

As polymerization from the surface of the substrate follows the same mechanism as solution polymerization, monomers that can be polymerized in solution polymerization can be directly adopted into the disclosed method.

Living or controlled radical polymerization, such as atom transfer radical polymerization, nitroxide mediated polymerization, and reversible addition-fragmentation chain transfer polymerization, allows synthesis of polymers with controlled molecular weight, polydispersity, and architectures from many different types of monomers. By using living polymerization, the disclosed method allows the thickness of the coating to be controlled from a few nanometers up to hundreds of nanometers and further allows the structure of polymer coating on substrates to be controlled. Transmission electron microscopy is used to directly observe the coating thickness and uniformity on particle or substrate surfaces. In this instance, the average and standard deviation of coating thickness can be calculated from transmission electron microscope pictures from more than 10 different coated substrates at a magnification between ×20,000 and ×100,000. The standard deviation of the coating thickness on the substrates varies less than 15% of the average coating thickness, where the scale bar is 100 nm.

The living nature of the controlled radial polymerization used in the disclosed method also enables the synthesis of a multilayered coating on the substrate. In one example, a second monomer or a second set of monomers can be added to the reaction flask after a predetermined reaction time. In another example, after the end of the first polymerization, the substrates can be separated from the reaction mixtures, purified, and then subjected to a second polymerization with a second monomer or second set of monomers. In both cases, a second layer of coating can be formed with a composition that is different from that of the first layer. In the latter approach, the method allows the synthesis of a second layer with a completely different composition. The above steps can be repeated any number of times and in any different combinations to provide a multilayered coating.

Examples of monomers that can be used in the disclosed method include, but are not limited to, acrylonitrile, styrene, divinylbenzene, 4-methylstyrene, 3-methylstyrene, 2-methylstyrene, 4-vinylanisole, 4-fluorostyrene, 2-fluorostyrene, 3-fluorostyrene, 4-chloromethylstyrene, 4-(tert-butyl)styrene, 3-chlorostyrene, methyl methacrylate, methyl acrylate, ethyl methacrylate, ethyl acrylate, n-propyl acrylate, n-propyl methacrylate, iso-propyl methacrylate, iso-propyl acrylate, n-butyl acrylate, n-butyl methacrylate, sec-butyl acrylate, sec-butyl methacrylate, tert-butyl acrylate, tert-butyl methacrylate, tert-amyl methacrylate, n-hexyl acrylate, n-octyl methacrylate, 2-ethylhexyl acrylate, n-decyl methacrylate, iso-decyl acrylate, iso-decyl methacrylate, undecyl methacrylate, n-dodecyl acrylate, n-dodecyl methacrylate, 1-hexadecyl methacrylate, stearyl acrylate, stearyl methacrylate, cyclohexyl acrylate, cyclohexyl methacrylate, 3,3,5-trimethylcyclohexyl methacrylate, isobornyl methacrylate, benzyl acrylate, benzyl methacrylate, pentabromophenyl acrylate, pentabromophenyl methacrylate, pentafluorophenyl acrylate, pentafluorophenyl methacrylate, phenyl acrylate, phenyl methacrylate, 1,1,1,3,3,3-hexafluoroisopropyl acrylate, 1H,1H,2H,2H-heptadecafluorodecyl acrylate, 1H,1H,2H,2H-heptadecafluorodecyl methacrylate, 1H,1H,3H-hexafluorobutyl acrylate, 1H,1H,3H-hexafluorobutyl methacrylate, 1H,1H,3H-tetrafluoropropyl methacrylate, 1H,1H,5H-octafluoropentyl acrylate, 1H,1H,5H-octafluoropentyl methacrylate, 1H,1H,7H-dodecafluoroheptyl methacrylate, 1H,1H-heptafluorobutyl acrylate, 2,2,2-trifluoroethyl acrylate, 2,2,2-trifluoroethyl methacrylate, hexafluoro-iso-propyl methacrylate, pentafluorophenyl acrylate, pentafluorophenyl methacrylate, perfluorocyclohexylmethyl methacrylate methacrylamide, acrylamides, 4-vinyl pyridine, N,N-dimethylaminoethyl methacrylate, N,N-diethylaminoethyl methacrylate, glycidyl methacrylate, 2-hydroxyethyl acrylate, and 2-hydroxyethyl methacrylate, glycidyl acrylate, 4-vinylaniline, 3-vinylaniline, N-iso-propylacrylamide, N,N-diethylacrylamide, N,N-dimethylacrylamide, poly(ethylene glycol) methacrylate, poly(ethylene glycol) acrylate, poly (ethylene glycol) methyl ether methacrylate, poly(ethylene glycol) ethyl ether methacrylate, poly(ethylene glycol) methyl ether acrylate, 1,10-decanediol dimethacrylate, 1,3-butanediol dimethacrylate, 1,4-butanediol diacrylate, 1,4-butanediol dimethacrylate, 1,4-diacryloylpiperazine, 1,4-phenylene diacrylate, 1,5-pentanediol dimethacrylate, 1,6-hexanediol diacrylate, 1,6-hexanediol dimethacrylate, 1,9-nonanediol dimethacrylate, 2,2-bis(4-methacryloxyphenyl) propane, 2,2-bis[4-(2-acryloxyethoxy)phenyl]propane, 2,2-bis[4-(2-hydroxy-3-methacryloxypropoxy)phenyl]propane, 2,2-dimethylpropanediol dimethacrylate, diethylene glycol diacrylate, diethylene glycol dimethacrylate, dipropylene glycol dimethacrylate, ethylene glycol diacrylate, ethylene glycol dimethacrylate, ethylene glycol dimethacrylate, ethylene glycol dimethacrylate, N, N' ethylene bisacrylamide, N,N'-methylenebisacrylamide, N,N'-hexamethylenebisacrylamide, N,N-diallylacrylamide, tetraethylene glycol dimethacrylate, trans-1,4-cyclohexanediol dimethacrylate, triethylene glycol diacrylate, triethylene glycol dimethacrylate, triethylene glycol dimethacrylate, 1,1,1-trimethylolpropane triacrylate, 1,1,1-trimethylolpropane trimethacrylate, dipentaerythritol pentaacrylate, pentaerythritol tetraacrylate, pentaerythritol triacrylate, poly(ethylene glycol) diacrylate, and poly(ethylene glycol) dimethacrylate.

Alternately, the initiator moieties (Y) can be any functional group that can initiate at least one type of polymerization. Examples of such polymerization include, but are not limited to, free radical polymerization and controlled radical polymerization such as, atom transfer radical polymerization (U.S. Pat. No. 5,763,548), nitroxide mediated polymerization (U.S. Pat. No. 6,353,107), and reversible addition-fragmentation chain transfer polymerization (U.S. Pat. No. 7,205,362).

The thickness of the polymer coating can be controlled by adjusting the polymerization conditions such as reaction time, reaction temperature, monomer concentration, catalyst concentration and solvent selection. The average polymer coating thickness, which can be measured by direct observation via transmission electron microscopy, ranges from a few nanometers to more than 100 nm.

The polymer coating can be polymer chains with one end anchored on substrates. The polymer can be homopolymer or copolymer.

Chemical composition of the polymer coating can be varied by tuning the comonomer compositions during the polymerization. In addition, after polymerization, chemical modification can be used to adjust the chemistry of the coating. The flexibility of coating composition makes it simple to optimize the adhesion between the color pigment and the polymer coating.

In one example, the colored system is prepared by mixing a dispersion of the coated substrates and a dispersion of the color pigments.

In one exemplary embodiment, small molecular reactants are added to enhance or adjust the interactions between the color pigments and the coated substrates. The small molecular reactants that can be used include, but are not limited to, alkyl or alkyl aryl bromide. In one example, an alkyl or alkyl aryl bromide is used with a coating that includes poly(N,N-dimethylaminoethylmethacrylate) (PDMAEMA). In this example, the tertiary amine group of the coated substrate is quaternized by the bromide, thereby providing a positive charge to the polymers. As a result, the adhesion between the coating of the coated substrates and the negatively charged color pigments is enhanced. It is to be realized that the selection of materials, such as alkyl chains, within the coating of the coated substrate can greatly influence the adsorption kinetics and the final performance of the coated substrate. For example, use of longer chains in the alkyl or alkyl aryl bromide may increase the hydrophobicity, incorporation of polar groups such as hydroxyls into the alkyl or alkyl aryl bromide may increase the hydrophilicity, etc.

In the instance where the substrate includes, for example, aluminum, the coated substrate can have sizes and densities that are much higher than that of typical color pigments, resins, and solvents. As such, the coated substrates can be readily separated from the solvent via sedimentation or centrifugation. In this instance, the color strength of the supernatant will give a clear indication of the separation of color pigments and the coated substrates. In one example, sedimentation or centrifugation of the disclosed colored system yields a clear top layer (solvent) and a colored bottom layer containing both the color pigments and the coated substrates (see FIG. 1). In contrast, a solution containing uncoated substrates and color pigments show clear separation of color pigments and substrates, where the color pigments are enriched in the supernatant.

In one instance, the color pigments adhere to the coated substrates as determined by a sedimentation test, which is a test for bleeding of pigments. The term "adhere" refers to the extent of difficulty in separating the color pigments from the polymer coated substrates in the physiological environment within typical paint/ink systems. The sedimentation test involves dispersing the colored system in one or more solvents and allowing the substrates to settle by sedimentation. In this case, the color pigments adhering to the coated substrates means that there is little, if any, coloration in the supernatant liquid and the sedimented substrates have a deep, even coloration. In one example, the color pigments adhere to the substrates such that the concentration of color pigments in the supernatant liquid is less than 100 ppm under the sedimentation test where 0.300 grams of solids of the disclosed colored system is dispersed in 15 mL of N-methylpyrrolidone (NMP) and the substrates are allowed to settle by sedimentation.

In another instance, the amount of colored pigment adherence to the coated substrates in the sedimentation test can be measured using an optical absorbance analysis. Under this analysis, the optical absorbance of the supernatant liquid is analyzed at a wavelength where the color pigment gives maximum absorbance. The concentration of the color pigment in the solvent can be calculated using a linear regression equation obtained from a calibration curve of absorbance versus concentration for the specific colored pigment being utilized. If the volume of the supernatant liquid following centrifugation is measured quantitatively, then the total amount of colored pigment that is not adhered to the coated substrate can be calculated from the measured concentration and compared with the original amount of the colored pigment, or in other words, the total amount of the colored pigment added at the start of the reaction. In one example, the colored pigment adheres to the coated substrate such that the amount of colored pigment that adheres to the coated substrate is greater than 90% of the original pigment amount. In an exemplary embodiment, the colored pigment stably adheres to the coated substrate such that the amount of colored pigment that adheres to the coated substrate is greater than 99% of the original pigment amount. In this occurrence, the strong interactions between color pigments and polymer coating create stable adhesion between the color pigments and the coated substrates.

The strong adhesion between color pigments and the coated substrates in the disclosed system also makes it possible to adjust the composition of the system and provide flexibility in the formulation. For example, additional solvents, resins, and additives can be added to the colored system without noticeable separation of the color pigments and the coated substrates. The colored system can be concentrated, diluted, and solvent-exchanged. The resulting colored system can be in the form of a concentrate, thereby reducing storage space, lowering shipping and handling costs, limiting hazards, and improving shelf-stability.

In another embodiment, the disclosed colored system includes the coated substrates with the color pigments attached thereto, and a solvent or solvent mixture only. In this embodiment, the system can be used directly without the addition of any other dispersants and/or resins, or in other words, as a resin-less paint/ink system. The term "resin-less" is defined herein as paint/ink systems that have no additional dispersant and/or resin in their formulation, other than those that are attached to the surface of the substrate. The term "additional dispersants and/or resins" herein means polymers that are separate from the polymer chains that are attached to the surface of the substrate, and are commonly added in the art as dispersing, film forming and/or adhesive agents to coating formulations such as inks and paints. The additional resins, for example, can be alkyd, polyester, polyamide, polyimide, silicone, phenolic, urea, melamine, epoxy, polyurethane, polyolefines, polyvinyl, and polyacrylic resins. Examples of the additional dispersants can be found in Organic coatings: science and technology, third edition (New York: John Wiley & Sons, 2007), pages 440 and 446, which is incorporated herein by reference.

In such resin-less systems, the polymer coating on the coated substrates provides film forming capabilities and promote adhesion to the surface that is coated with the resin-less system upon drying of the solvent. Since there is no external resin to hinder the orientation of the coated substrates during the final stage of drying, the resin-less paint/ink systems result in coatings with enhanced orientation and improved metallic effects. The absence of unnecessary resins also lowers the viscosity of the resin-less paint/ink system. In this example, the resin-less paint/ink system has a high concentration of coated substrates with color pigments attached thereto. As a result, the resin-less paint/ink system can reduce the volatile organic content (VOC) emission and the final coatings can have increased opacities.

In yet another embodiment, the disclosed colored system can be combined with a conventional paint/ink/plastic system. In this case, the resulting paint can be used with increased pigment-to-binder ratio due to the self-dispersion and film forming capabilities of the polymer coating on the coated substrates. In one example, the combined systems have a pigment-to-binder ratio between 1 and 10.

One of the advantages of the disclosed colored system is that the system can be prepared in a short period of time and requires little equipment for its manufacture beyond that of heating and mixing. Also, due to the strong affinity between the color pigments and the polymer coated substrates, in most cases, the resulting systems are ready for application soon after the addition of the necessary components.

In yet another embodiment, an article includes a coating that contains the disclosed colored system.

EXAMPLES

Example 1

Preparation of Polymer-Coated Al Substrates by ATRP 4.8 kg of SSP-695, a lenticular aluminum pigment from Silberline Mfg. Co, Inc with a solids content of 75.68%, was added to a 20 liter reactor flask along with 11.64 kg of Glycol Ether PM Acetate. The mixture was agitated until uniform, and then heated to 80° C. Then, 16 ml of ATRP initiator 3-(trimethylsilylpropyl)-2-bromo-2-methylpropionate was added. The reaction was run for six hours at 80° C., and the slurry was then cooled to room temperature and the solids separated by filtration. The final product had a solids content of 64.56%, by weight.

30.8 grams of the above product with immobilized initiator was dispersed in 310 mL of Glycol Ether PM Acetate in a 500 ml reaction flask. To this was added 80 mL of N,N-dimethylaminoethylmethacrylate (DMAEMA) under moderate agitation. The flask was sealed and high purity nitrogen was introduced at the bottom of the flask to inert the system. After 30 minutes, 0.423 grams of CuBr was added, the nitrogen introduction line was raised above the liquid level, and the speed increased to 750-800 RPM. The temperature was slowly raised to 60° C. over a period of one hour, maintaining agitation and nitrogen flow.

In a separate flask, pentamethyldiethylenetriamine (PMDETA) was degassed with nitrogen for 30 minutes. At the end of the one-hour mixing above, 0.62 mL of PMDETA was transferred to the reaction flask using a nitrogen-purged syringe to initiate the polymerization reaction.

The reaction was run for five hours, maintaining the temperature at 60° C. At the end of the reaction, the vessel was opened to the air and about 150 grams of PM Acetate was added to quickly reduce the temperature, quenching the reaction. The solids were separated from the slurry by centrifugation, then re-dispersed in PM Acetate and again centrifuged to wash out remaining reactants. The product was dispersed in N-methylpyrrolidone (NMP) and centrifuged again to change the solvent. The solids content of the finished product was measured as 46.02% by weight. The amount of polymer bound to the aluminum flakes was determined by TGA as being 9.54% of the weight of solids.

Example 2

Preparation of Green Al Colored System 4.35 grams of the polymer-coated aluminum pigment from Example 1 was dispersed into 15.0 grams of NMP in a 40 ml vial. Separately, 0.40 grams of a solid dispersion of phthalocyanine Pigment Green 7 (40% pigment by weight dispersed in a polyvinylchloride/polyvinylacetate copolymer) was dispersed in 5.0 grams of NMP. The PG7 dispersion was added to the aluminum pigment dispersion, and then 4.0 grams of a 4% solution of allyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light green color, while the solid sediment was a bright, deep green color.

Example 3

Preparation of Blue Al Colored System 4.35 grams of the polymer-coated aluminum pigment from Example 1 was dispersed into 15.0 grams of NMP in a 40 ml vial. Separately, 0.40 grams of a solid dispersion of phthalocyanine Pigment Blue 15:4 (40% pigment by weight dispersed in a polyvinylchloride/polyvinylacetate copolymer) was dispersed in 5.0 grams of NMP. The PB 15:4 dispersion was added to the aluminum pigment dispersion, and then 4.0 grams of a 4% solution of allyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light blue color, while the solid sediment was a bright, deep blue color.

Example 4

Preparation of Red Al Colored System 4.35 grams of the polymer-coated aluminum pigment from Example 1 was dispersed into 15.0 grams of NMP in a 40 ml vial. Separately, 0.40 grams of a solid dispersion of quinacridone Pigment Red 122 (40% pigment by weight dispersed in a polyvinylchloride/polyvinylacetate copolymer) was dispersed in 5.0 grams of NMP. The PR122 dispersion was added to the aluminum pigment dispersion, and then 4.0 grams of 4% solution of allyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light red color, while the solid sediment was a bright, deep red color.

Example 5

Preparation of Red Al Colored System 4.35 grams of the polymer-coated aluminum pigment from Example 1 was dispersed into 15.0 grams of NMP in a 40 ml vial. Separately, 0.40 grams of a solid dispersion of perylene Pigment Red 179 (40% pigment by weight dispersed in a polyvinylchloride/polyvinylacetate copolymer) was dispersed in 5.0 grams of NMP. The PR179 dispersion was added to the aluminum pigment dispersion, and then 4.0 grams of a 4% solution of allyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light red color, while the solid sediment was a bright, deep red color.

Example 6

Preparation of Yellow Al Colored System 4.35 grams of the polymer-coated aluminum pigment from Example 1 was dispersed into 15.0 grams of NMP in a 40 ml vial. Separately, 0.40 grams of a solid dispersion of isoindolinone Pigment Yellow 110 (40% pigment by weight dispersed in a polyvinylchloride/polyvinylacetate copolymer) was dispersed in 5.0 grams of NMP. The PY110 dispersion was added to the aluminum pigment dispersion, and then 4.0 grams of a 4% solution of allyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light yellow color, while the solid sediment was a bright, deep yellow color.

Example 7

Preparation of Yellow Al Colored System 4.35 grams of the polymer-coated aluminum pigment from Example 1 was dispersed into 15.0 grams of NMP in a 40 ml vial. Separately, 0.40 grams of a solid dispersion of isoindolinone Pigment Yellow 139 (40% pigment by weight dispersed in a polyvinylchloride/polyvinylacetate copolymer) was dispersed in 5.0 grams of NMP. The PY 139 dispersion was added to the aluminum pigment dispersion, and then 4.0 grams of a 4% solution of allyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light yellow color, while the solid sediment was a bright, deep yellow color.

Example 8

Preparation of Violet Al Colored System 4.35 grams of the polymer-coated aluminum pigment from Example 1 was dispersed into 15.0 grams of NMP in a 40 ml vial. Separately, 0.40 grams of a solid dispersion of quinacridone Pigment Violet 19 (40% pigment by weight dispersed in a polyvinylchloride/polyvinylacetate copolymer) was dispersed in 5.0 grams of NMP. The PV19 dispersion was added to the aluminum pigment dispersion, and then 4.0 grams of a 4% solution of allyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light violet color, while the solid sediment was a bright, deep violet color.

Example 9

Preparation of Red Al Colored System 4.35 grams of the polymer-coated aluminum pigment from Example 1 was dispersed into 15.0 grams of NMP in a 40 ml vial. Separately, 0.40 grams of a solid dispersion of quinacridone Pigment Red 122 (40% pigment by weight dispersed in a polyacrylate polymer) was dispersed in 5.0 grams of NMP. The PR122 dispersion was added to the aluminum pigment dispersion, and then 4.0 grams of 4% solution of allyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light red color, while the solid sediment was a bright, deep red color.

Example 10

Preparation of Blue Al Colored System 4.35 grams of the polymer-coated aluminum pigment from Example 1 was dispersed into 15.0 grams of NMP in a 40 ml vial. Separately, 0.40 grams of a solid dispersion of phthalocyanine Pigment Blue 15:4 (40% pigment by weight dispersed in a polyvinylchloride/polyvinylacetate copolymer) was dispersed in 5.0 grams of NMP. The PG7 dispersion was added to the aluminum pigment dispersion, and then 5.2 grams of 4% solution of benzyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light green color, while the solid sediment was a bright, deep green color.

Example 11

Preparation of Blue Al Colored System 4.35 grams of the polymer-coated aluminum pigment from Example 1 was dispersed into 15.0 grams of NMP in a 40 ml vial. Separately, 0.40 grams of a solid dispersion of phthalocyanine Pigment Blue 15:4 (40% pigment by weight dispersed in a polyvinylchloride/polyvinylacetate copolymer) was dispersed in 5.0 grams of NMP. The PG7 dispersion was added to the aluminum pigment dispersion, and then 5.5 grams of a 4% solution of hexyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light green color, while the solid sediment was a bright, deep green color.

Aesthetic Evaluation

Each of the pigments from Examples 2 through 11 were diluted to 20 mL total volume with NMP and redispersed to produce resinless paints with polymer-coated aluminum flakes at 10% by weight. These paints were drawn down with a #14 wire-wound rod onto opacity charts and baked briefly at 60° C. to flash off residual solvent.

Figure 3:
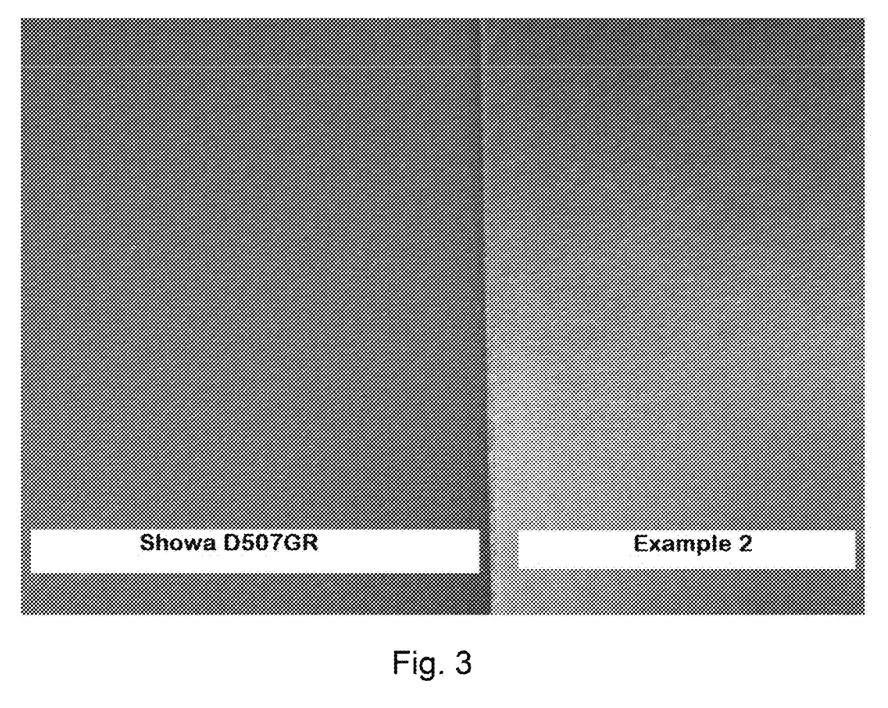
FIG. 3 shows an aesthetic comparison of drawdowns from ink of Showa's FriendColor and resin-less ink of phthalocyanine Pigment Green 7 and poly(N,N-dimethylaminoethylmethacrylate) encapsulated Silberline Sparkle Silver® Premium 695. Drawdown from resin-less ink displays strong metallic luster.

For comparison, four commercial colored aluminum pigments from Showa, D554RE red, DE529YE yellow, D551 BL blue, and D507GR green were evaluated. Since these products cannot produce resin-less paints, they were dispersed into a commercial automotive refinish paint system at 10% solids by weight, then drawn down onto opacity charts with a #14 wire-wound rod and baked briefly at 60° C. to flash off residual solvent. FIG. 3 shows an aesthetic comparison of drawdowns from ink of Showa's FriendColor and the resin-less ink of Example 2 (phthalocyanine Pigment Green 7 and poly(N,N-dimethylaminoethylmethacrylate) encapsulated Silberline Sparkle Silver® Premium 695).

The drawdowns from resin-less ink displays strong metallic luster.

Figure 1:
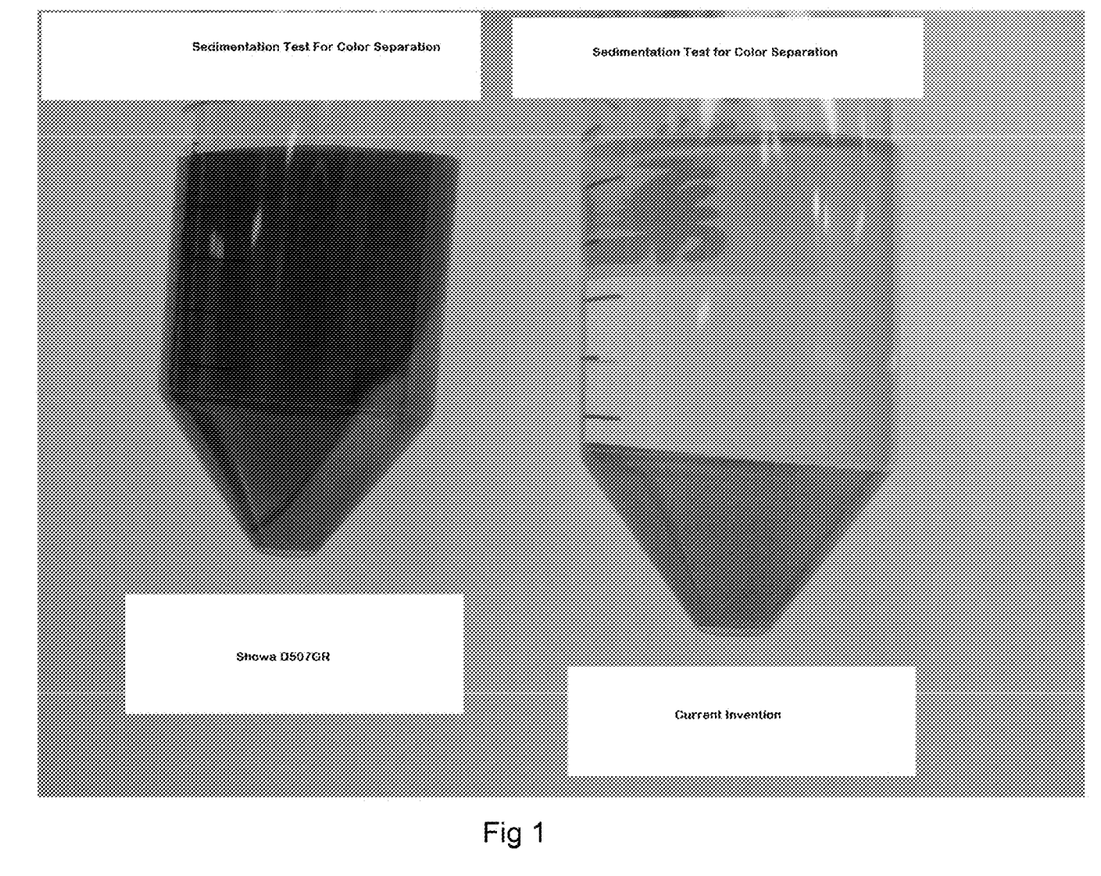
FIG. 1 illustrates the results of a sedimentation test for paints containing a) poly(N,N-dimethylaminoethylmethacrylate) encapsulated Silberline Sparkle Silver® Premium 695 and b) the original Silberline Sparkle Silver® Premium 695. In both cases, the remaining components of the dispersion are N-methylpyrrolidone and phthalocyanine Pigment Green 7.

Colorimetry of the above drawdowns was evaluated using an X-Rite MA68 goniospectrophotomer. Table 1 below shows the colorimetric comparison at five angles of Examples 2-11 and commercially available colored aluminum products. As is clear from Table 1, the pigments of Examples 2 through 11 have a brighter, smoother coloration than the commercially available products.

cate that the product of the current invention has much less pigment extracted from the aluminum flakes than the commercially available pigment. FIG. 1 shows the results of the sedimentation test.

Concentration of Green Pigment in MEK Supernatants

| | |
|---|---|
| Example 1 | 46.4 ppm |
| Showa D507GR | 917.3 ppm |

Figure 2:
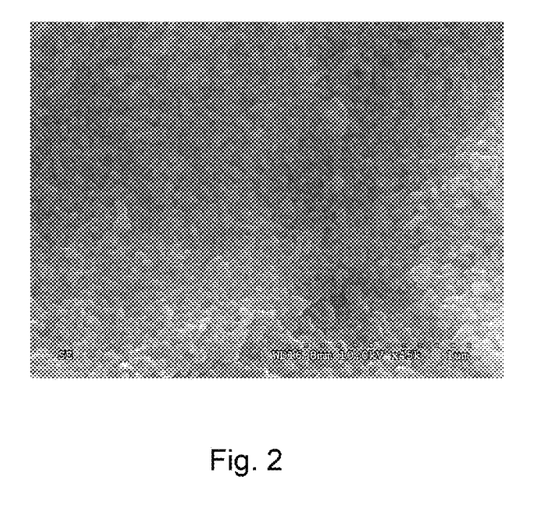
FIG. 2 is a scanning electron microscope image of color pigments coated aluminum flakes separated from paints containing phthalocyanine Pigment Green 7 and poly(N,N-dimethylaminoethylmethacrylate) encapsulated Silberline Sparkle Silver® Premium 695.

The strong adhesion between color pigment and aluminum flakes is further confirmed by scanning electron microscopy. As shown in FIG. 2, the surface of the Al flakes is evenly coated with color pigments after multiple solvent washes.

TABLE 1

| | 15° | | | 25° | | | 45° | | | 75° | | | 110° | | |
|---|---|---|---|---|---|---|---|---|---|---|---|---|---|---|---|
| | L* | C* | h° | L* | C* | h° | L* | C* | h° | L* | C* | h° | L* | C* | h° |
| Red Aluminums | | | | | | | | | | | | | | | |
| Example 4 | 146.44 | 14.61 | 336.09 | 104.02 | 12.35 | 328.15 | 55.91 | 12.28 | 312.33 | 42.61 | 9.58 | 312.80 | 39.96 | 9.78 | 312.76 |
| Example 5 | 113.00 | 25.21 | 349.28 | 80.60 | 16.19 | 7.01 | 48.70 | 11.43 | 35.58 | 36.59 | 10.21 | 31.89 | 33.78 | 11.56 | 24.99 |
| Example 8 | 135.04 | 34.78 | 329.95 | 92.66 | 23.09 | 330.75 | 51.79 | 12.42 | 339.18 | 36.35 | 10.99 | 346.57 | 33.42 | 14.01 | 338.71 |
| Example 9 | 129.31 | 37.11 | 315.43 | 89.89 | 23.59 | 318.65 | 49.82 | 11.11 | 331.64 | 39.31 | 9.60 | 334.67 | 37.86 | 12.35 | 331.23 |
| Showa D554RE | 85.02 | 50.50 | 355.25 | 68.88 | 43.61 | 0.84 | 48.34 | 35.28 | 14.94 | 39.17 | 34.68 | 26.33 | 35.90 | 36.44 | 29.41 |
| Yellow Aluminums | | | | | | | | | | | | | | | |
| Example 6 | 154.34 | 27.61 | 79.94 | 104.95 | 17.94 | 88.50 | 56.54 | 8.30 | 121.03 | 42.19 | 8.20 | 123.69 | 39.87 | 9.75 | 115.14 |
| Example 7 | 114.20 | 24.58 | 74.97 | 93.37 | 24.83 | 83.02 | 65.99 | 24.96 | 91.21 | 54.18 | 25.41 | 94.11 | 52.31 | 28.80 | 93.70 |
| Showa DE529YE | 98.59 | 59.43 | 92.47 | 83.52 | 52.66 | 94.02 | 60.63 | 38.58 | 97.23 | 48.97 | 31.56 | 99.67 | 45.49 | 30.71 | 99.07 |
| Blue Aluminums | | | | | | | | | | | | | | | |
| Example 3 | 115.25 | 74.68 | 227.50 | 80.31 | 52.70 | 225.98 | 41.85 | 24.16 | 232.00 | 30.81 | 15.95 | 242.44 | 29.40 | 17.91 | 243.64 |
| Example 10 | 116.95 | 54.23 | 223.03 | 85.13 | 40.38 | 227.02 | 48.56 | 22.37 | 243.59 | 36.05 | 17.12 | 251.33 | 33.93 | 18.65 | 249.25 |
| Example 11 | 123.75 | 72.96 | 228.81 | 79.61 | 49.16 | 223.01 | 38.36 | 24.63 | 230.48 | 25.04 | 18.18 | 242.77 | 24.27 | 19.75 | 238.61 |
| Showa D551BL | 90.19 | 54.25 | 234.97 | 70.25 | 42.78 | 237.46 | 44.37 | 25.69 | 247.84 | 33.63 | 18.55 | 259.35 | 30.68 | 18.48 | 262.61 |
| Green Aluminums | | | | | | | | | | | | | | | |
| Example 2 | 123.10 | 63.42 | 199.93 | 91.58 | 45.24 | 197.61 | 55.68 | 19.53 | 196.21 | 46.70 | 11.83 | 195.70 | 44.81 | 12.81 | 194.53 |
| Showa D507GR | 105.08 | 64.30 | 167.98 | 90.68 | 58.08 | 169.71 | 60.84 | 41.57 | 174.73 | 40.62 | 32.26 | 179.87 | 34.71 | 30.55 | 180.24 |

Pigment Attachment

To measure the strength of the attachment of the pigment to the aluminum flakes, the green aluminum pigment of Example 2 and the commercial green aluminum pigment Showa D507GR were tested for pigment bleed. Enough of each product to provide 0.3000 grams of solid material was weighed out, and 15.0 ml of methyl ethyl ketone (MEK) added was to each. The pigments were thoroughly dispersed in the MEK, and the resulting slurries were transferred to test tubes, stoppered, and allowed to settle undisturbed overnight. The next day, the supernatant liquid from Example 2 was transparent and had only a very slight green tint, while the supernatant liquid from Showa D507GR was dark green and nearly opaque. Optical absorbance of the two supernatants, at a wavelength of 540 nm, was measured using a Spec 20 spectrophotometer. The results, shown below, clearly indi- Example 12

Preparation of Polymer-Coated Al Substrates by ATRP 4.8 kg of SSP-695, a lenticular aluminum pigment from Silberline Mfg. Co, Inc with a solids content of 75.68%, was added to a 20 liter reactor flask along with 11.64 kg of Glycol Ether PM Acetate. The mixture was agitated until uniform, and then heated to 80° C. Then, 16 ml of ATRP initiator 3-(trimethylsilylpropyl)-2-bromo-2-methylpropionate was added. The reaction was run for six hours at 80° C., and the slurry was then cooled to room temperature and the solids separated by filtration. The final product had a solids content of 55.75%, by weight.

1291.5 grams of the above product with immobilized initiator was dispersed in 9675 mL of Glycol Ether PM Acetate in a 20 liter reaction flask. To this was added 4320 ml of N,N-dimethylaminoethylmethacrylate (DMAEMA) under moderate agitation. The flask was sealed and high purity nitrogen was introduced at the bottom of the flask to inert the system. After 30 minutes, 15.23 grams of CuBr was added and the speed increased to 550-600 RPM. The temperature was slowly raised to 60° C. over a period of one hour, maintaining agitation and nitrogen flow.

In a separate flask, pentamethyldiethylenetriamine (PMDETA) was degassed with nitrogen for 30 minutes. At the end of the one-hour mixing above, 22.5 mL of PMDETA was transferred to the reaction flask using a nitrogen-purged syringe to initiate the polymerization reaction.

Aesthetic Evaluation

The pigments from Examples 13 and Comparative Example 1 were diluted to 17.5 mL total volume with NMP and redispersed to produce resinless paints with polymer-coated aluminum flakes at 10% by weight. These paints were drawn down with a #14 wire-wound rod onto opacity charts and baked briefly at 60oC to flash off residual solvent. Colorimetry of the above drawdowns was evaluated using an X-Rite MA68 goniospectrophotomer. Table 2 below shows the colorimetric comparison at five angles of Example 13 and Comparative Example 1. As is clear from the Table 2, the pigment of Examples 13 has a much stronger chroma than that of Comparative Example 1.

TABLE 2

| | Green Aluminums | | | | | | | | | | | | | | |
|---|---|---|---|---|---|---|---|---|---|---|---|---|---|---|---|
| | 15° | | | 25° | | | 45° | | | 75° | | | 110° | | |
| | L* | C* | h° | L* | C* | h° | L* | C* | h° | L* | C* | h° | L* | C* | h° |
| Example 13 | 135.11 | 48.43 | 190.07 | 77.40 | 32.05 | 188.99 | 37.68 | 19.75 | 188.55 | 24.79 | 16.42 | 191.25 | 24.24 | 19.02 | 187.44 |
| Comp Ex 1 | 151.14 | 12.03 | 151.04 | 99.17 | 8.39 | 164.54 | 54.06 | 7.36 | 218.82 | 46.23 | 7.73 | 208.21 | 45.54 | 8.51 | 201.09 |

The reaction was run for five hours, maintaining the temperature at 60° C. At the end of the reaction, the slurry was cooled to 100° F. to stop the reaction. The solids were separated from the slurry by centrifugation, then re-dispersed in N-methylpyrrolidone (NMP) and again centrifuged to wash out remaining reactants. The product was again dispersed in NMP and centrifuged. The solids content of the finished product was measured as 40.74% by weight. The amount of polymer bound to the aluminum flakes was determined by TGA as being 17.68% of the weight of solids.

Example 13

Preparation of Green Al Colored System 3.44 grams of the polymer-coated aluminum pigment from Example 12 was dispersed into 15.0 grams of NMP in a 40 ml vial. Separately, 0.90 grams of a solid dispersion of phthalocyanine Pigment Green 7 (40% pigment by weight dispersed in a polyvinylchloride/polyvinylacetate copolymer) was dispersed in 5.0 grams of NMP. The PG7 dispersion was added to the aluminum pigment dispersion, and then 7.45 grams of a 4% solution of hexyl bromide in NMP was added. The mixture was agitated for 15 minutes at room temperature, and then the temperature was raised to 90° C. over a period of about 30 minutes. The mixture was agitated for 15 minutes more at 90° C. and then cooled to room temperature. The solids were separated by centrifugation, then re-dispersed twice in NMP and centrifuged again. The supernatant liquid from each centrifugation was only a very light green color, while the solid sediment was a bright, deep green color.

Comparative Example 1

The process of Example 13 was repeated, but with no hexyl bromide added. The solids were separated by centrifugation, then re-dispersed twice in NMP and centrifuged again. The supernatant liquid from each centrifugation was a dark, opaque green color, while the solid sediment was very light green.

Pigment Attachment

To measure the degree of pigment attachment, the supernatant liquids from the first centrifugation of Example 13 and Comparative Example 1 were collected quantitatively and tested for optical absorbance as described above. From the calculated concentrations of green pigment and the known volumes, the total amounts of green pigment in the supernatants were determined and the attachment of pigment to the aluminum flakes was calculated as a percentage of the amount of green pigment that was added to the reaction vials, with results below:

%Attachment of Green Pigment

| Example 13 | 99.80% |
|---|---|
| Comparative Example 1 | 26.70% |

Example 14

Resin-Less Paint of the Polymer-Coated Al Substrates of Example 1

Resin-less paint of the polymer-coated aluminum substrates of Example 1 was prepared by diluting wet paste with PM acetate. The final paint has pigment weight concentration of 10.1%. Paint was siphon sprayed onto the plastic panel of polystyrene, poly(methyl methacrylate) and acrylonitrile butadiene styrene (ABS). The sprayed panel was further dried in oven.

While the disclosed colored system and methods have been described in conjunction with a preferred embodiment, it will be apparent to one skilled in the art that other objects and refinements of the disclosed colored systems and methods may be made within the purview and scope of the disclosure.

The disclosure, in its various aspects and disclosed forms, is well adapted to the attainment of the stated objects and advantages of others. The disclosed details are not to be taken as limitations on the claims.

The invention claimed is:

1. A colored system, comprising:
   a plurality of color pigments; and
   a plurality of coated substrates, each of the coated substrates including a substrate having a surface and a polymer coating surrounding the surface of the substrate, the polymer coating including polymer chains having the density of the polymer chains is in the range from 0.001 to 2 chain/nm$^2$, wherein each of the polymer chains is obtained by polymerizing monomers from the surface of the substrate via an initiator moiety that is covalently bonded to the surface of the substrate so that the polymer chains are covalently bonded to the surface of the substrate, the polymer chains are not crosslinked to one another such that each of the chains has flexibility, at least one of the monomers of each of the polymer chains contains at least one functional group that is capable of adhering to the color pigments, the color pigments adhere to the coated substrates via the at least one functional group that is capable of adhering to the color pigments, and a thickness of the coating of the coated substrates varies less than 15% of an average thickness of the coating.

2. The colored system of claim 1, wherein the colored pigments adhere to the coated substrates such that an amount of the colored pigments that adhere to the coated substrates is greater than 90% of an original amount of the colored pigments.

3. The colored system of claim 1, wherein the at least one functional group contains an ionic charge.

4. The colored system of claim 1, wherein the at least one functional group includes quaternary amines.

5. The colored system of claim 1, wherein the substrate includes aluminum.

6. The colored system of claim 1, further comprising a solvent.

7. The colored system of claim 6, wherein the solvent is selected from the group consisting of water, lower alcohols, ethers, esters, ketones, glycol ethers, pyrrolidones, sulfoxides and/or mixtures thereof.

8. The colored system of claim 6, wherein the colored system does not include any additional dispersants and/or resins other than those that are attached to the surface of the substrate.

9. The colored system of claim 8, wherein the system is a colored metallic ink or paint system.

10. A method of producing the colored system of claim 1, comprising:

mixing a dispersion of the coated substrates and a dispersion of the color pigments.

11. The method of claim 10, further comprising adding a molecular reactant to quaternize a tertiary amine group that is included in the polymer coating of the coated substrate.

12. An article, comprising:

a coating that comprises the colored system of claim 1.

* * * * *